Patented June 13, 1939

2,162,059

UNITED STATES PATENT OFFICE 2,162,059

BINDER COMPOSITION

Walter C. Chedic, Oakland, Calif.

No Drawing. Application April 15, 1938,
Serial No. 202,271

2 Claims. (Cl. 22—188)

This invention relates to substances used in foundry practice for cementing together granular materials, such as sand, used in molds or the cores thereof.

It is an object of the invention to provide an improved binder composition for the use described which will produce molds and cores of exceptional strength.

Another object of the invention is to provide a binder which will produce molds capable of making clean and smooth castings.

A further object of the invention is to provide a binder useful in the preparation of baked cores which greatly reduces the time necessary to properly dry the cores.

Still another object of the invention is to provide a binder which, by reducing fusion of the molding sand with the molten metal, does not produce the usual thick scale on the casting which quickly abrades the edges of cutting tools.

Yet another object of the invention is to provide a binder which will generate a minimum amount of gas when heated to the temperature of the molten metal thereby greatly lessening the creation of blow-holes in the castings.

The composition consists of a mixture of powdered mineral pitch, a powdered mineral filler such as aluminum silicate or bentonite, a fibrous vegetable or mineral filler such as goulac or paper pulp, and a cementitious material such as finely pulverized corn flour.

In preparing the composition, the ingredients are preferably mixed together in the following proportions:

| | Pounds |
|---|---|
| Gilsonite (300° melting point) | 74 |
| Bentonite (aluminum silicate) | 31 |
| Goulac (paper pulp) | 15 |
| Tux (corn flour) | 20 |

The above compound finds particular utility in the preparation of cores although it may also be used to improve the surfaces of the molds by dusting directly on said surfaces after the latter have been dampened. In preparing a core, a quantity of the compound is added to the desired amount of molding sand and the mixture is then thoroughly agitated to coat each sand granule with the binder. Sufficient water is then added to the mixture to dampen it and the latter is then tamped into the core box. The core is then placed in a heated oven so as to melt the pitch and cause its dispersion throughout the mass. After heat treatment sufficient to render the core quite dry, the latter is ready for insertion into the mold.

The inclusion of bentonite in the compound is to provide a mineral filler possessed of a greater degree of fineness than the sand for substantially though not completely filling the voids between the sand granules thus permitting the use of less cementitious material to thoroughly impregnate the core mass and at the same time, by providing greater density in the core, rendering the latter possessed of maximum strength.

While goulac or paper pulp is preferably employed due to its satisfactory qualities and low cost, other fibrous materials such as mineral wool may be substituted therefor. The reason for including the goulac in the composition is so that the minute fibers thereof being dispersed through the admixture of binder and sand will mechanically bind the mass together and render it highly resistant to breakage.

The tux or corn flour, when the binder and sand are dampened by the addition thereto of water, provides a cement for adhesively binding together the sand granules so that the core will not crumble before transference to the baking oven. When once in the oven the melted gilsonite combining with the flour paste creates a cement which renders the core highly resistant to fracture even when subjected to unusually rough treatment.

The exact amount of my improved binder composition to be mixed with a given quantity of sand cannot definitely be stated here due to the wide variations of conditions which arise in each molding job. The correct proportions may only be arrived at through experience gained by actual use thereof with different qualities and grades of sand and with the different metals to be cast.

The improved binder composition of my invention described above, since it contains a minimum amount of water and is devoid of liquid oils which have been used heretofore, is capable of producing cores which may be baked dry in a shorter period of time, and with materially less heat, than may cores made with generally used wet binders; possesses the property of forming a gas cushion, due to combustion of the gilsonite when the latter comes in contact with the molten metal, between the metal and the core thereby greatly lessening fusion of the sand with the metal with the result that the castings have a minimum amount of hard scale; and which, due to the dry condition of the core and the slow burning of the pitch therein, does not create such an excess of gas that the latter will be driven into the molten metal causing blow-holes or pockets therein.

Another desirable condition which my improved binder composition is responsible for is that of creating a minimum amount of ash thereby resulting in rapid and easy reclaiming of the sand from the used cores.

I claim:

1. A binder composition, useful in bonding granular materials forming cores for metal molding, comprising substantially the following ingredients and proportionate weights:

| | Pounds |
|---|---|
| Gilsonite | 74 |
| Bentonite | 31 |
| Goulac (paper pulp) | 15 |
| Tux (corn flour) | 20 |

2. A binder composition, useful in bonding together granular materials forming cores for metal molding, comprising, in dry form, a predominant amount of mineral pitch, substantially forty percent as much bentonite as the amount of mineral pitch, substantially twenty percent as much fibrous vegetable filler as the amount of said pitch, and substantially twenty-seven percent as much of a vegetable substance possessing adhesive properties as the amount of said pitch.

WALTER C. CHEDIC.